INVENTOR,
HARVEY Z. BURKHOLDER
BY Jacobi & Davidson
ATTORNEYS

United States Patent Office

3,485,214
Patented Dec. 23, 1969

3,485,214
DUAL EGG CONVEYOR CAGE CONSTRUCTION
Harvey Z. Burkholder, Ephrata, Pa., assignor to Favorite Nest Works, Inc., New Holland, Pa., a corporation of Pennsylvania
Filed Jan. 12, 1968, Ser. No. 697,376
Int. Cl. A01k 31/16
U.S. Cl. 119—48                             11 Claims

ABSTRACT OF THE DISCLOSURE

A poultry cage arrangement which includes at least one and preferably a plurality of cages, each cage having a sloped bottom wall which leads onto a collecting conveyor. Means are associated with each cage for causing an egg laid therein to travel onto the main conveyor only at predetermined locations through relatively small openings so that damage of eggs by the chickens laying the same and damage of eggs by collisions with one another are minimized or precluded. A preferred embodiment of the invention contemplates the use of an auxiliary conveyor means for gently moving eggs from the cages in which they are laid through an opening to the collecting conveyor.

---

This invention generally relates to poultry cages and particularly concerns poultry cages of the type providing automatic transfer of eggs laid therein to a main egg collecting and transfer conveyor.

The art of commercial egg production has, in recent years, undergone quite significant changes particularly predicated by the advent of automated machinery. Thus, a commercial egg farmer today no longer has to collect and process eggs manually but can, for the most part, bring to bear the full advantages of automation.

An integral part of any automated commercial egg operation is, of course, the actual egg collecting process from the laying cages. In this regard, cages of many different varieties have been introduced to the art, such cages being specifically adapted to transfer eggs laid therein onto a main egg collecting and transfer conveyor. One construction of such a prior art cage arrangement which has achieved some measure of commercial success is an arrangement wherein a plurality of generally rectangular cages are provided extending along the length of a main egg collecting and transfer conveyor and preferably to either side thereof. The individual cages themselves are constructed such that at least one side wall of each cage is adjacent to and confronts the main egg collecting and transfer conveyor, the side wall being formed so as to provide an opening along the bottom portion thereof extending across the entire width of the cage. The bottom wall portion of each cage defines a surface sloping downwardly toward the main egg collecting and transfer conveyor such that the eggs laid within each cage will roll down the bottom wall portion thereof through the opening across the entire width of the side wall and onto the main conveyor.

The above-described cage construction obviously possesses at least one advantage in that eggs laid within the various cages are quickly removed from each cage and deposited upon a main egg collecting and transfer conveyor. On the other hand, a number of difficulties have been found to exist with cages of this construction. For one, it is well known that hens within such cages will attempt to recover their eggs from the main conveyor if at all possible. In so doing, oftentimes the eggs are damaged. Since the opening present in the side wall of each individual cage confronting the main conveyor is normally of quite large dimension, a hen can easily extend an appendage or a beak therethrough and thus contact the eggs on the main conveyor. Additionally, when birds die in such cages having sloped bottom wall portions, it is quite possible for the legs, head, or wings of the dead bird to extend through the opening and block the further transfer of eggs on the main conveyor from other cages. Such large openings, however, even considering the disadvantages inherent therein, were thought necessary so that eggs laid anywhere within the confines of each cage and caused to roll down the inclined bottom wall portion thereof would be able to pass through the side wall of the cage without obstruction and thus be deposited on the main conveyor.

The relatively large opening provided in each side wall confronting the main conveyor of these prior art arrangements is the cause of a further major disadvantage. Since the cage arrangement might extend along the entire length of the conveyor and to opposite sides thereof, the cages directly opposite each other would have openings in their confronting side walls which coincide. These cages would thus be capable of delivering the eggs laid therein to the same portion of the main conveyor. Accordingly, eggs laid in two oppositely situated cages can roll down the inclined bottom wall portions thereof toward the same spot on the main conveyor and thus collide. Needless to say, even the slightest collision of fragile items such as eggs might impart serious damage and breakage to thus decrease the efficiency of the operation and present unsanitary conditions.

Accordingly, it is clearly evident that a need exists in the egg producing art for an improved cage construction which provides automatic egg collecting operation, but which eliminates the problems associated with the prior art. Thus, it is a primary object of the subject invention to provide a novel cage construction which satisfies this need.

Other and more specific objects of the subject invention are:

(a) To provide a novel cage construction wherein eggs are removed from the cage immediately after laying thereof;

(b) To provide a novel cage construction wherein the eggs, once removed from the cages, cannot be worked back or damaged by the laying hens;

(c) To provide a novel cage construction wherein the flow of eggs on a main collecting conveyor cannot be blocked by a dead bird;

(d) To provide a novel cage construction wherein collision of eggs emptying onto the same main conveyor cannot occur;

(e) To provide a novel cage construction that, in an economical, efficient and sanitary manner, completely provides for automated egg collection; and, (f) To provide a novel attachment for existing cages of the type above-described whereby the above objects are likewise achieved.

Now, in order to implement these and still further objects of the invention, which will become more readily apparent as the description proceeds, the invention contemplates the provision of a novel poultry cage arrangement which comprises, in a broad form thereof, a plurality of poultry cages disposed along the length of and preferably to either side of a main egg collecting and transfer conveyor although a stair-step cage arrangement having cages along only one side of a collecting conveyor can also be utilized to good advantage. Each poultry cage includes a bottom wall portion inclined towards the main conveyor and a side wall positioned adjacent the main conveyor in confronting relationship thereto. Egg guide means are associated with each cage and define a limited egg transfer opening through a predetermined portion of the side wall of each cage confronting the main conveyor. Finally, collecting means are provided adjacent the egg guide means for collecting and transferring the eggs laid within the cages to the limited egg transfer opening, and thus onto the main conveyor only at specified locations.

In a preferred embodiment of the subject invention, the inventive egg guide means are physically disposed in the path of egg travel between the interior of each poultry cage and the adjacent length of the main egg collecting and transfer conveyor, whereby eggs laid within each cage would roll down the inclined bottom wall portion thereof and gently abut against the egg guide means. The collecting means, in a preferred embodiment of the invention, comprises an auxiliary conveyor mechanism constrained to run along the bottom wall portion of each cage adjacent the egg guide means. The auxiliary conveyor mechanism serves to gently convey eggs abutted against the egg guide means until the eggs are adjacent a limited egg transfer opening defined by the egg guide means, wherein the eggs are then deposited on the main egg collecting and transfer conveyor only at predetermined locations.

The invention will be better understood and additional features thereof will become more clearly evident when reference is given to the following detailed description read in conjunction with the appended drawings, wherein.

Figure 1:
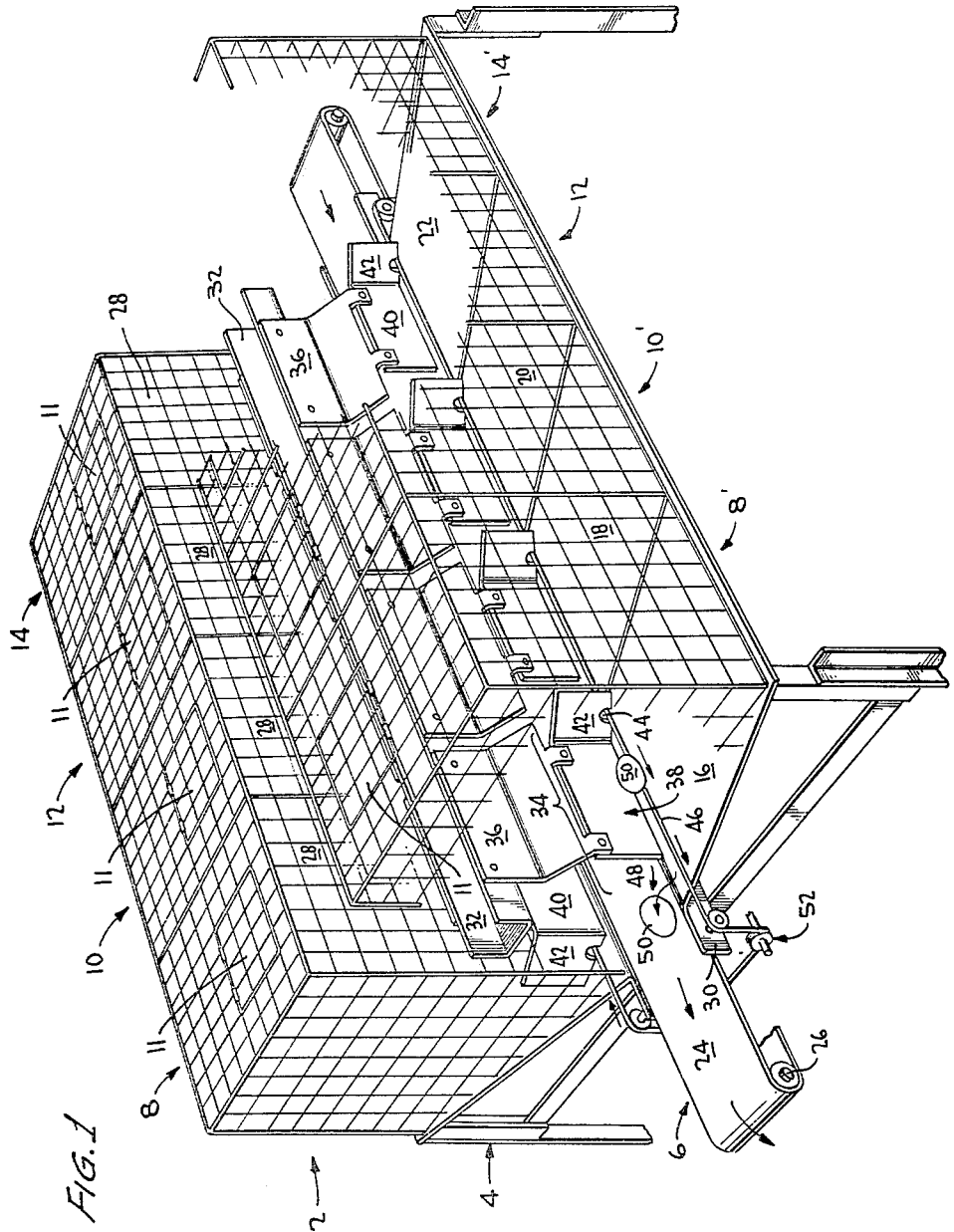
FIGURE 1 is a perspective view of a dual-conveyor cage construction in accordance with the subject invention with cages arranged along the length of and to either side of a main conveyor.

Referring now to the drawings and particularly to FIGURE 1, there is depicted a poultry cage arrangement which embodies the features of the subject invention. A group of cages generally designated 2 and supported at either end by a frame 4 are disposed along the length of and preferably to either side of a main egg collecting and transfer conveyor generally designated 6 comprising a conveyor belt 24 running in a belt channel 30 and driven by rollers 26. The poultry cage arrangement provides a plurality of individual cage sections 8, 10, 12 and 14 on one side of the main conveyor 6, and a plurality of individual cage sections 8', 10', 12' and 14' on the other side of the main conveyor 6, cages 8 and 8', 10 and 10' and so forth, being disposed substantially opposite one another. As is apparent, any number of cage sections could be provided along the length of main conveyor 6, and if so desired, cages could be placed along only one side of the main conveyor 6 in a stair-step arrangement.

Each one of the plurality of cage sections or cages are preferably rectangular in structure and include doors 11 or the like for easy access. Each cage comprises respective bottom wall portions 16, 18, 20 and 22 constructed so as to be inclined to slope downwardly toward the main egg collecting and transfer conveyor 6 and a side wall portion 28 adjacent to and confronting the main conveyor 6. The side wall portions 28 of each of the cages do not define an entirely closed surface, but rather, provide a large opening generally designated 34 at the lower ends thereof across the entire width of each cage. The construction as so far described is similar to that utilized in the prior art poultry cage arrangements in that an egg 50 deposited anywhere on a bottom wall portion 16, 18, 20 or 22 of each individual cage would, by virtue of the inclination of the bottom wall portions, roll down the same through the large openings 34 in the side walls 28 onto the main egg collecting and transfer conveyor 6. However, as pointed out above, such an arrangement alone possesses many disadvantages. For one, eggs from cages that are oppositely situated such as cages 8 and 8', 10 and 10', and so forth, could very easily collide as they roll onto the main conveyor 6 in an uncontrolled manner. Furthermore, hens within each individual cage could easily reach through the large openings 34 in the side walls 28 in an attempt to work back eggs deposited on the main conveyor 6. Accordingly, it is primarily at this point that the subject invention wholly departs from those constructions known to the art.

Immediately above the main egg collecting and transfer conveyor 6, a feed trough 32 may be provided to which is removably affixed a plurality of braces or supports 36, preferably metallic in construction, one brace for each of the plurality of cages. Alternatively, the braces or supports may comprise a unitary structure extending the length of a plurality of cages. The metallic braces or supports 36 are bent through two angles as shown, so that the lower portion of these supports communicates with the top of the openings 34 in the side walls 28 of the cages. An egg guide means, generally designated 38, is preferably affixed to the lower portion of each of the brace or support members 36 through the depicted tabular construction although other means may be used. Each egg guide member 38 preferably comprises a planar plastic or wire mesh surface 40 extending across and blocking the major portion of the opening 34 in each side wall 28, the planar surface extending in a direction substantially parallel to the direction of movement of the main conveyor 6 depicted by the arrow. Each egg guide means 38 thus forms an obstruction in the path of travel of eggs 50 from each of the individual cages to the main conveyor 6 and will actually arrest the advance of eggs from the cages onto the main conveyor 6.

The length of the substantially planar surface 40 of each egg guide 38 is such that, when the egg guides are placed to partially block the openings 34 in the side walls 28, a small opening 48 is defined communicating between the interior of the individual cages and the main egg conveyor 6. Opening 48 is of a dimension such that an egg 50 will easily fit therethrough, yet, the opening 48 is small enough so that a hen within a cage cannot contact eggs on the main conveyor 6. An angular extending portion 42 is provided for each of the planar surface members 40 of the egg guide means 38, the angular extension 42 having a small hole 44 cut out of the bottom portion. Holes 44 in each of the angular portions of the egg guide means, serve to provide a guide means or channel for an auxiliary conveyor mechanism 46 preferably comprising a continuous rope or cord, as shown although a narrow belt or other conveying surface could also be utilized. The rope or cord of the auxiliary cnveyor 46 is constrained to run along the bottom wall portion of each of the individual cage members, through the guides provided holes 44 in the extensions 42 of each egg guide means, and functions as a collecting mechanism wherein, eggs abutted against the egg guide means 38 by the blocking action thereof will be gently carried by the motion of the cord or rope along the surface of the planar member 40 to the small opening 48 between the cage and the main conveyor whereat the eggs are then deposited upon the conveyor 6. The auxiliary conveyor is driven by a general drive mechanism 52 preferably contained beneath the belt 24 and drive rollers 26 of the main conveyor 6.

Figure 2:
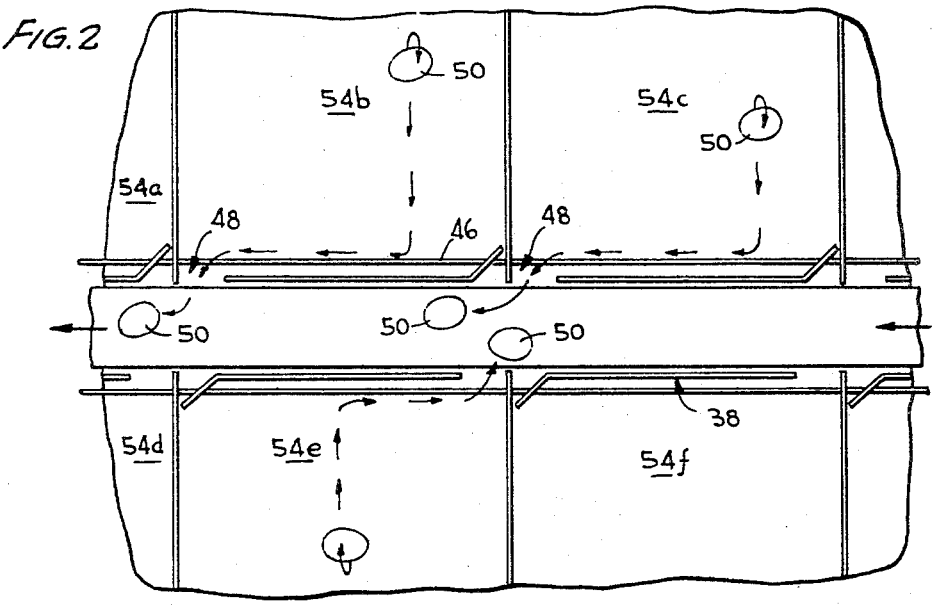
FIGURE 2 is a schematic plan view of the novel egg guide means and auxiliary conveyor mechanism of the subject invention depicting the controlled transfer of eggs from each cage onto predetermined portions of a main egg collecting and transfer conveyor.
Figure 3:
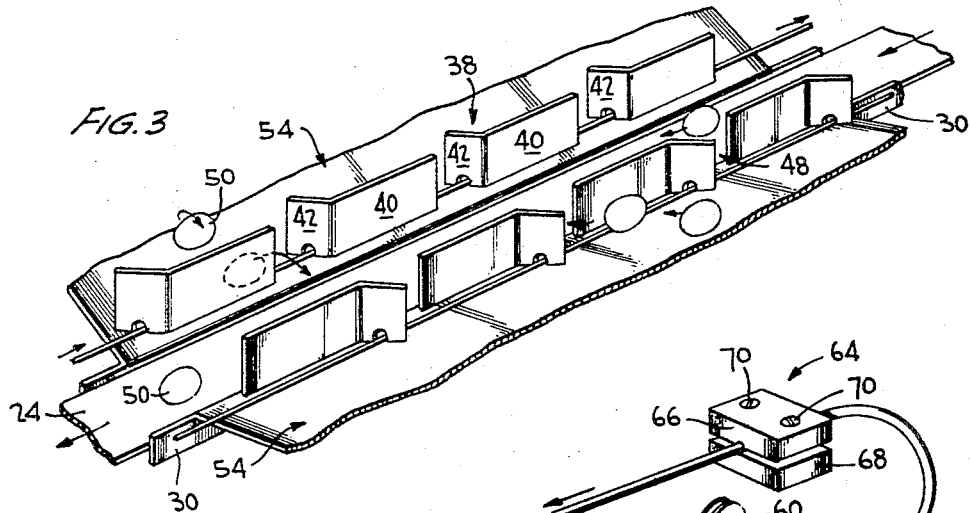
FIGURE 3 is a pictorial view of a portion of the novel cage construction of the subject invention which more clearly depicts the use of the egg guide means and auxiliary conveyor in effecting a transfer operation onto a main egg collecting and transfer conveyor.
Figure 3A:
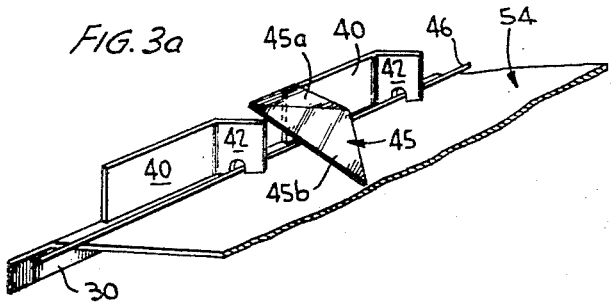
FIGURE 3a is a pictorial view of a portion of the construction shown in FIGURE 3 depicting the use of a cover apparatus further preventing interference with egg transfer and collection by birds within the cages; and, FIGURE 4 is a diagrammatic view of a portion of the auxiliary conveyor of the subject invention depicting a preferred drive mechanism utilized therewith.

Referring now to FIGURES 2, 3 and 3a, the alignment of the various egg guide means 38 when in place within the cages, can be easily appreciated. As is apparent, the planar surface 40 of each egg guide means 38 extends substantially across the entire width of each cage member now designated 54a through 54f. The extending portion 42 of each planar member 40 which provides the guiding channel or means for the auxiliary conveyor 46, is preferably positioned in a corner of each of the individual cages. Opposite cages, for example, cages 54a and 54d, 54b and 54e, and so forth, are provided with egg guide means 38 placed so as to define various egg transfer openings 48 only adjacent predetermined portions of the belt 24 of the main conveyor. The openings 48, for opposite cages, appear at opposite ends of the individual cages so that eggs laid in opposite cages cannot roll down toward the same spot on the main conveyor 24 and thus, the eggs can never collide with each other. In this regard, the operation of the novel cage construction is such that eggs 50 laid within the various individual cages would roll down the inclined bottom wall portions thereof in the direction of the broken arrows shown in FIGURE 2. to gently abut against and be blocked by the planar surface 40 of the egg guide means 38. By operation of the auxiliary cord conveyor 46, the eggs are then carried along the planar surface 40 to the small opening 48 communicating between the individual cages and the belt 24 of the main conveyor 6 whereat the eggs roll onto the main conveyor. The spacing of the individual openings 48 in each cage is such that the eggs 50 are deposited at different predetermined locations upon the main conveyor 6. In actual operation of the inventive construction, it is contemplated that the auxiliary conveyor 46 would continuously run so as to collect and gently sweep out eggs laid within the individual cages and abutted against the egg guide means and deposit the eggs at the predetermined locations on the main conveyor 6 defined by the openings 48. Such operation is in direct contrast with the random depositing of eggs onto the main conveyor in prior art constructions. Further, the belt 24 of the main conveyor 6 could be run only periodically to transport the eggs 50 thereon to a non-illustrated egg processing location. If desired, a cover apparatus 45 can be provided for each opening as depicted in FIGURE 3a. The cover apparatus may be simply constructed of sheet metal, for example, to include a top portion 45a and a slanted side portion 45b so as to further prevent hens within the cages from interfering with eggs on main conveyor 24, yet still allow easy transfer of eggs.

Figure 4:
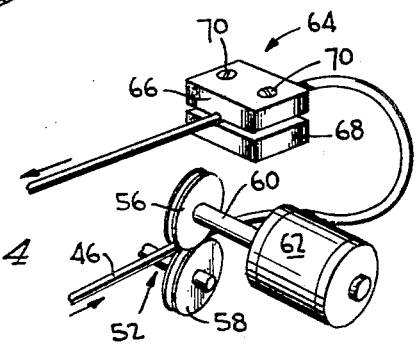

Referring now to FIGURE 4, a suitable drive mechanism generally designated 52 for the auxiliary rope or cord conveyor 46 is depicted as compirsing a drive roller 56 and a support roller 58 between which the cord 46 is placed. The drive roller 56 is driven by shaft 60 through the operation of a schematically illustrated motor 62. A frictional brake or drag mechanism generally designated 64 could also be provided along a portion of the auxiliary cord conveyor 46 so as to keep the cord or rope straight and taut throughout its length of travel through the individual poultry cages. The brake or drag mechanism 64 is preferably constructed so as to comprise a top and bottom block 66 and 68, respectively, between which the cord 46 is placed. The top and bottom blocks 66 and 68 are held together by means of connecting elements or bolts 70 which, when tightened, serve to bring the surfaces of blocks 66 and 68 closer together and thus serve to partially crimp the cord 46 of the auxiliary conveyor and thus set up a drag on the line. Although this illustrated drive mechanism for the auxiliary conveyor is preferred, it should be readily apparent that other equivalent drive mechanism could well be utilized.

It should now be apparent that the objects initially set forth at the outset of this specification have been successfully achieved.

What is claimed is:
1. In a poultry cage arrangement having a main egg collecting and transfer conveyor and at least one cage positioned adjacent thereto with the cage having a bottom wall portion at least partially sloped toward said main egg collecting and transfer conveyor, the improvement comprising the combination of:
   egg guide means disposed in the path of egg travel between the interior of the cage and the adjacent length of said main collecting and transfer conveyor, said egg guide means providing an opening for egg travel between the interior of the cage and the main collecting and transfer conveyor; and,
   movable auxiliary conveyor means adjacent said egg guide means for conveying eggs along said egg guide means to said opening, whereby the eggs are transferred to said main conveyor only through said opening.
2. The improvement defined in claim 1, wherein said egg guide means comprises a substantially planar member positioned substantially parallel to the path of movement of said main conveyor.
3. The improvement defined in claim 2, wherein said substantially planar member is constructed of plastic material.
4. The improvement defined in claim 2, wherein said substantially planar member is positioned such that the opening is located to one side of the center of said adjacent length of said main conveyor.
5. The improvement defined in claim 2, wherein said auxiliary conveyor means is constrained to run along said bottom wall portion of said cage adjacent said substantially planar member.
6. The improvement defined in claim 5, wherein said auxiliary conveyor comprises a continuous cord.
7. The improvement defined in claim 6, further comprising drive means for said continuous cord.
8. The improvement defined in claim 5, wherein said substantially planar member includes an extending portion thereof disposed at an angle to the path of movement of said main conveyor, said extending portion defining guide means for said continuous cord.
9. In a poultry cage arrangement having a main egg collecting and transfer conveyor and a plurality of cages positioned adjacent thereto along the length and at opposite sides thereof, with each cage having a bottom wall portion at least partially sloped toward said main conveyor, the improvement which comprises transfer means for transferring eggs from the cages to the main conveyor only at predetermined portions of the conveyor length adjacent each cage, said transfer means transferring eggs from cages positioned along opposite sides of the main conveyor to different predetermined portions of the adjacent conveyor length between opposite cages.
10. A poultry cage arrangement comprising in combination:
   a main egg collecting and transfer conveyor;
   a plurality of cages disposed along the length of said main conveyor, each cage including a bottom wall portion inclined towards said main conveyor and a sidewall positioned adjacent said main conveyor in confronting relationship thereto;
   egg guide means defining a limited egg transfer opening through a predetermined portion of said sidewall of each cage; and,
   collecting means in each cage for collecting and transferring eggs in each cage to said limited egg transfer opening.
11. A poultry cage as defined in claim 9, wherein said collecting means comprises an auxiliary conveyor constrained to run along said bottom wall portion of each cage adjacent said egg guide means.

(References on following page)

References Cited

UNITED STATES PATENTS

| | | | |
|---|---|---|---|
| 1,096,300 | 5/1914 | Haakenson | 119—48 |
| 1,470,103 | 10/1923 | Raiche | 119—48 |
| 2,886,173 | 5/1959 | Scott | 119—48 X |
| 3,109,413 | 11/1963 | Patchett | 119—48 |
| 3,145,793 | 8/1964 | Ray | 119—48 X |
| 3,166,046 | 1/1965 | Peterson | 119—48 |
| 3,339,528 | 9/1967 | Summerour | 119—48 |

ALDRICH F. MEDBERY, Primary Examiner